United States Patent [19]

Zech

[11] 4,332,395
[45] Jun. 1, 1982

[54] SELF-PROPELLED LANDSAILER

[76] Inventor: Leonard E. Zech, 202 E. 37th St., Suite 9, Boise, Id. 83704

[21] Appl. No.: 170,012

[22] Filed: Jul. 18, 1980

[51] Int. Cl.³ ............................................. B62B 15/00
[52] U.S. Cl. .................................... 280/213; 280/269
[58] Field of Search ............... 280/213, 269; 180/2 A; 114/43

[56] References Cited

U.S. PATENT DOCUMENTS

| | | | |
|---|---|---|---|
| 299,317 | 5/1884 | Aspinwall | 180/2 A |
| 2,443,565 | 6/1948 | Land | 280/213 |
| 2,995,384 | 8/1961 | Rich | 280/269 |
| 3,311,388 | 3/1967 | Ryan et al. | 280/269 |
| 3,572,740 | 3/1971 | Rypinski | 114/43 X |
| 3,909,043 | 9/1975 | Black | 280/269 |
| 3,921,467 | 11/1975 | Matsuura | 280/269 |
| 4,049,287 | 9/1977 | Dudouyt | 280/213 |

FOREIGN PATENT DOCUMENTS 460911 12/1913 France .................................. 180/2 A Primary Examiner—John A. Pekar

[57] ABSTRACT

A wind or pedal propelled sail vehicle for land travel and particularly well adapted for highway travel. This invention relates to non-motorized land vehicles and more particularly to land sailing craft in which a sail is the principle propulsion means. This invention is comprised of a collapsible, metal tube frame of generally triangular configuration, which has attached thereto, three wheels and an occupant propelling means to facilitate locomotion over a hard surface. A conventional sailing rig extends above the frame and a novel rear steering means facilitates navigation. This invention is in no way a boat or sailboat using floats, or an iceboat using runners or skis.

4 Claims, 9 Drawing Figures

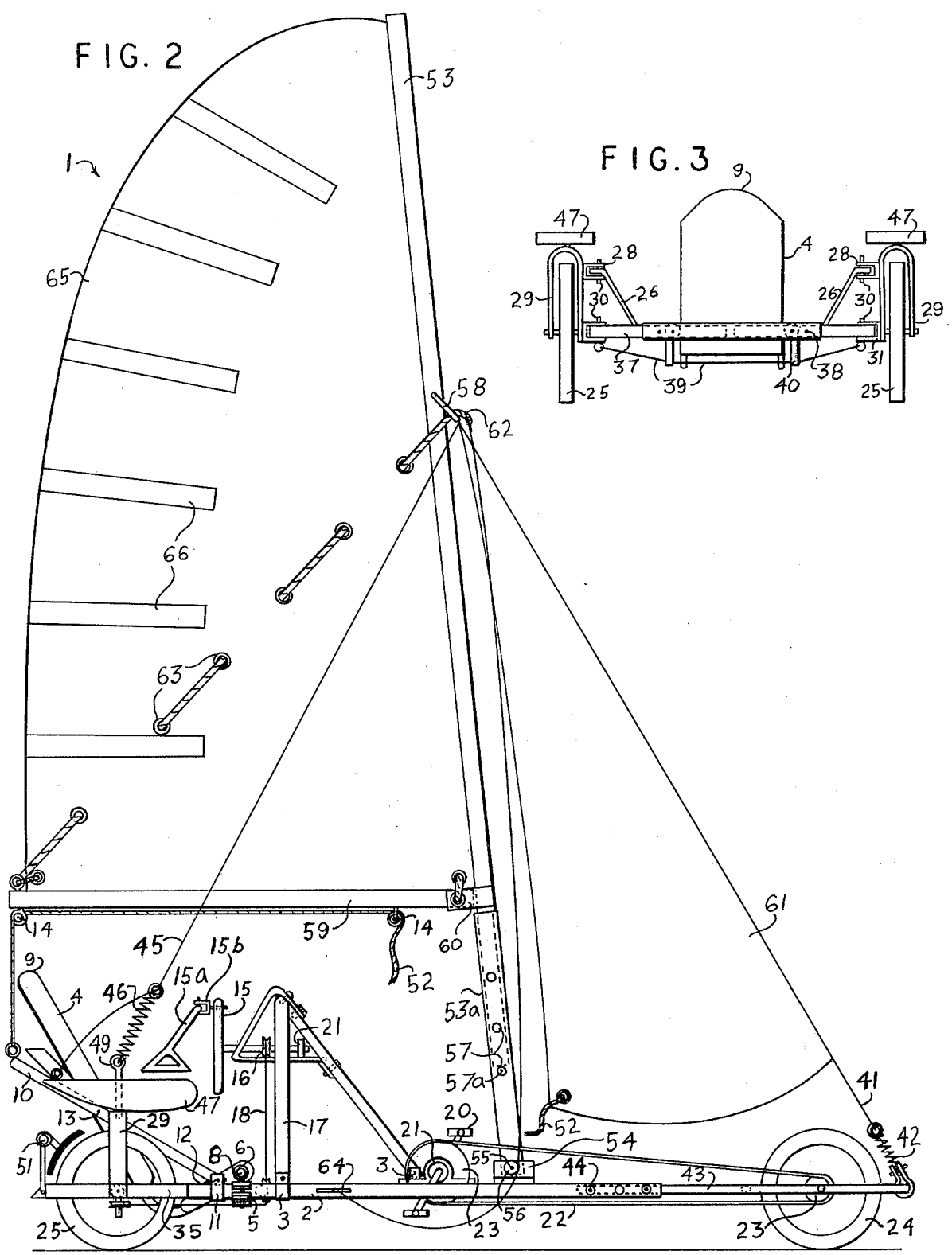

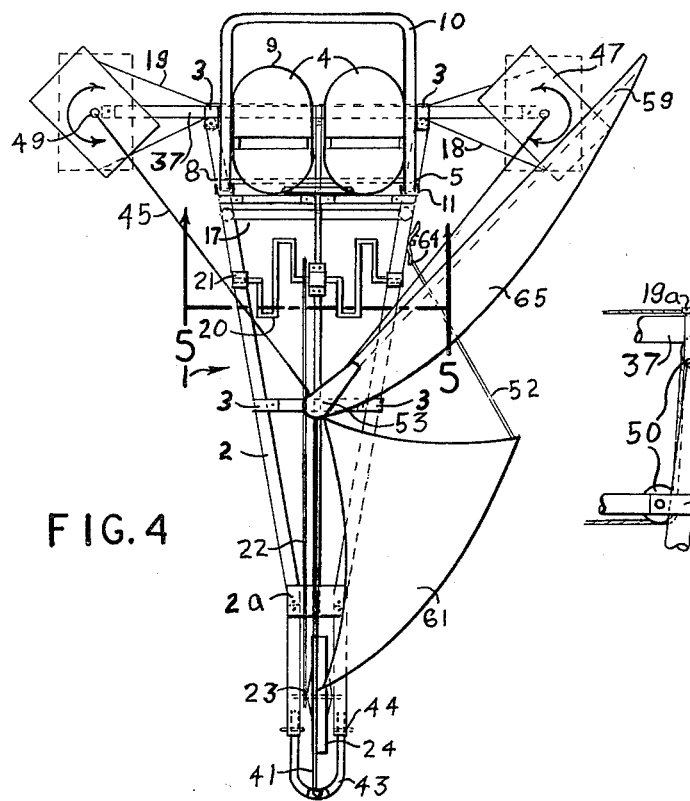
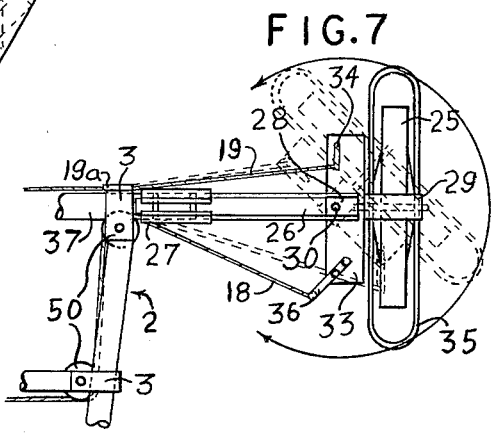
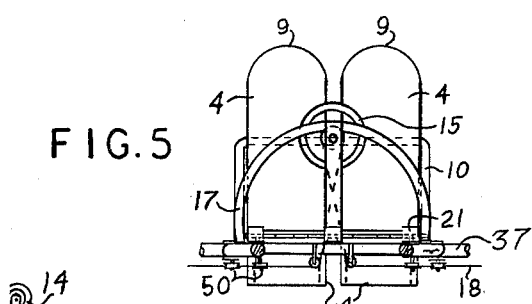
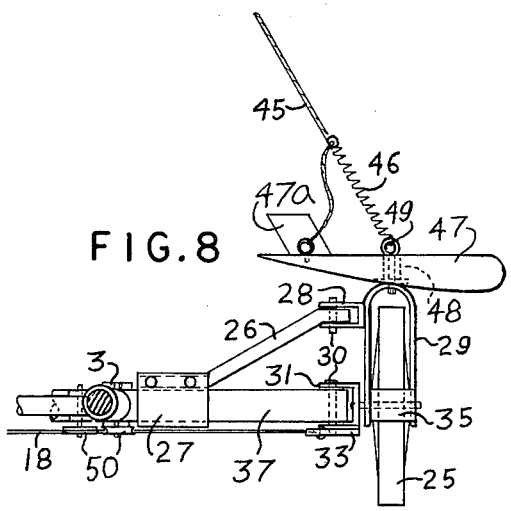
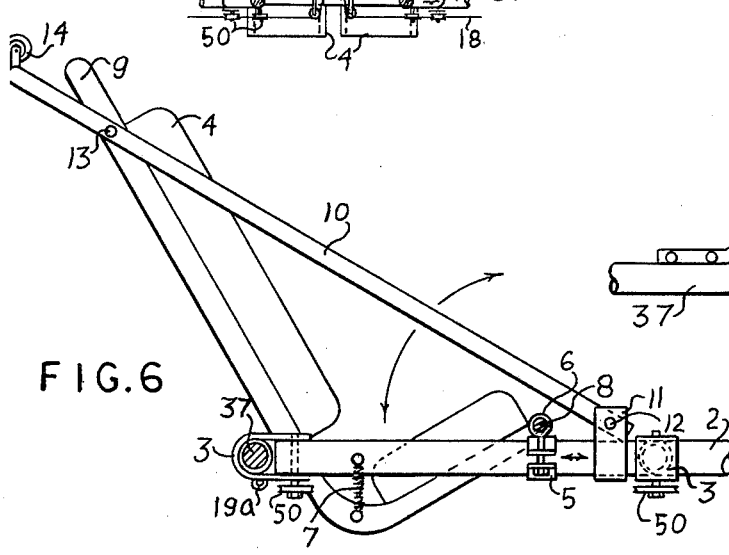
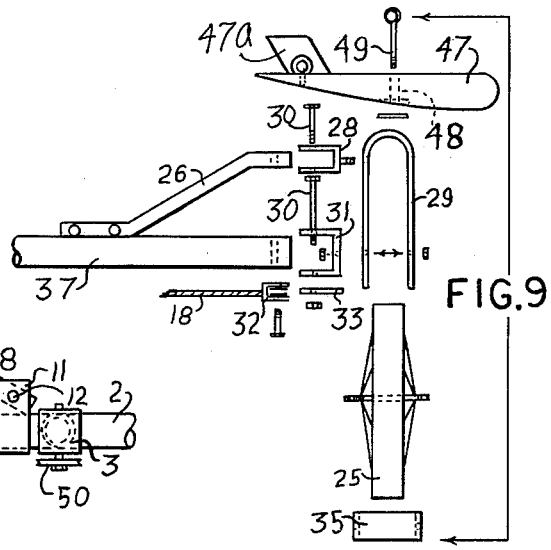

SELF-PROPELLED LANDSAILER

BACKGROUND OF THE INVENTION

1. Description of the Prior Art

Landsailing craft have been in existence for over a hundred years going back to the Conestoga wagon and the square-rigged sails of the early pioneers seeking new, inexpensive means, to travel west and reap the rewards of the new frontier. Early efforts were met with only limited success due to a lack of strong, light, structural material, inexperience with aerodynamic sail designs and technological knowhow resulting in craft content to go only downwind.

With improved technology, materials, and computer analysis of sail designs and airfoil shapes, the last decade has shown the most promise in the development of an efficient, all-around, sailing craft for land transportation. Man has often sought an easier and more relaxed means to travel, and at minimum expense. Such a craft fulfills these needs.

Lately, there is an upsurge in bicycle sales and in the number of patents employing a sail attached to bicycles to assist in road travel. The inherent disadvantage in bike sails is due to a basic physical law: A sail erected on a vehicle will undergo a tremendous heeling moment (tipping force) exerted through the center of pressure C.P. (or center of effort C.E.) proportional to the force of the wind. This heeling moment is compounded on bicycles due to the vehicles high center of gravity C.G., and generally high placement of the C.P. of the sail, resulting in a dangerous, unstable, and uncontrollable craft. Such two-wheeled vehicles are greatly limited in permissable sail area and are prone to tipping over in gusts. In U.S. Pat. No. 2,443,565, "Land Sail Vehicle," June 15, 1948, Land realizes a four-cornered frame of bicycle origin with more than one front wheel and using a drive shaft for the rear wheels. In U.S. Pat. No. 4,049,287, "Sail Vehicles," Sept. 20, 1977, Dudouyt's steering means will not adapt to the desired wide spacing of the wheels most directly below the C.P. of the sail to reduce heeling moment in this type of vehicle. In U.S. Pat. No. 3,572,740, "Collapsible Sail Propelled Vehicle," Mar. 30, 1971, Rypinski reveals a land sailing craft with some proven good features but unsuitable for road travels as it lacks an optional occupant propelling means if the wind should fail. As understood, such means could not be easily adapted without major redesign. Features in claim 1 elicit a chassis design utilizing: ". . . a pair of rear struts . . . a forward strut . . . a coupling means . . ." which are obviated and have no counterpart in the present invention.

In *Popular Science*, Nov. 1976, "Land Sailer for the Highway," Hybrid Windmobile, p. 102: James Amick realizes a three wheel electric drive windcar for highway use. The design is especially adapted to reduce drag to more effectively extend the range of the batteries. Amick's invention, although sleek in appearance, is not well suited to use the full power of the wind due to the effective small sail area comprised of rigid, symmetrical, airfoil sails. Experimentation and research have shown such sail configurations efficient only if the prevailing winds (true wind direction) approach the longitudinal axis of the vehicle from an angle of forty-five degrees or more. This disadvantage is compounded further by the lack of trimming control of the sail members preventing the vehicle from closehauling or developing thrust from a direction more directly into the prevailing winds. Also Amick's design is unduly heavy (720 lbs.), expensive (about $5,000), and complex, As understood the vehicle is not truly energy efficient since the batteries eventually require an external charge and there is no means for occupant propulsion.

Finally, a good example of the heretofore state of the art is illustrated in *Popular Science*, April 1980, pp. 106–108, "Landsailer for the 80's" by Paul Bolon and "a 25 mph prairie schooner", by Ben Kocivar (designed by Randy Schlitter). Bolon's landsailer would be unsuitable for road travel due to lack of occupant propelling means and a very limited steering means, inadequate for saftey in high speed congested travel on roadways. Schlitter's vehicle, although practical, has several deficiencies known to those skilled in the art. Said vehicle requires a "live" rear axle drive means activated by the pedals. Such axles are necessarily of solid steel construction and quite heavy. Also such axles provide no means for longitudinal adjustment to adapt to varying wind and road conditions. Additionally, experiment and research have shown a frame utilizing a bicycle-type front fork steering arrangement is not durable, stable, or reliable on a sailing vehicle due to the great side-loading wind forces which tend to lever and distort the fork construction. Furthermore, it is known in the art that excluding sail area, vehicle weight and rolling resistance determine the efficiency of a sailing craft. Wheels that include an integral transmission or ratchet means generally will not coast as freely as simplified, independent, ball bearing wheels of the same diameter as in the present invention.

In conclusion, Schlitter's vehicle places the lowest portion of the pilot's seat, at or above the hubs of the rear wheels. It is known in the art that the pilot of said vehicles constitutes the major portion of the vehicle's loaded weight and the position of said pilot will greatly infuence the handling characteristics of said craft. The present invention places the lower portion of the seat somewhat lower than the wheel hubs, advantageously, lowering the C.G. of said vehicle and correspondingly reducing the heeling moment permitting greater sail area, speed, and safety.

SUMMARY OF THE INVENTION

The present invention provides a land sailing craft with optional pedal drive making it well suited to cross-country travel on roadways. The principal object of the invention is energy conservation. We are presently in a period of fuel shortages and increasing inflation and cost of living compelling more people to stay at home. The present invention offers an economical, exciting, healhy, and beneficial means, for the average person to travel and enjoy the outdoors. Another object of the present invention is to offer a superior, more efficient craft, than heretofore developed by including features such as: a quick, sharp, steering response; adjustable rear axle and mast length to match wind and road conditions; efficient, guarded, low-friction wheels; improved braking and sail control means; occupant propelling means with selective gear shift; a low cost, easily manufactured, lightweight, streamline, adjustable, and collapsible chassis; improved wheel bracing for strength and reliability; a safety roll bar, suspended seat, adjustable fore and aft; a low C.G. to reduce heeling moment, permit greater sail area/speed; and an improved vehicle stabilizer and mast rigging to cope with gusty wind conditions. These and other features will be more clearly understood with reference to the following specifications and drawings.

BRIEF DESCRIPTION OF THE DRAWING

FIG. 2 is a right side elevational view of a modified form of a landsailer of the present invention;

FIG. 3 is a rear elevational view showing the rear axle support and bracing and a means for longitudinal adjustment;

FIG. 4 is a top plan view of a two seat version of the present invention;

FIG. 5 is a front elevational view taken along line 5—5 of FIG. 4 showing the arcuate support and cable routing of the steering;

FIG. 6 is an enlarged, fragmentary right side elevation of a seat mounting means revealing a preferred embodiment;

FIGS. 7,8,9 are enlarged, fragmentary top plan, front elevational, and exploded views, respectively, showing a preferred means for rear wheel steering and bracing.

DESCRIPTION OF THE PREFERRED EMBODIMENT

Figure 1:
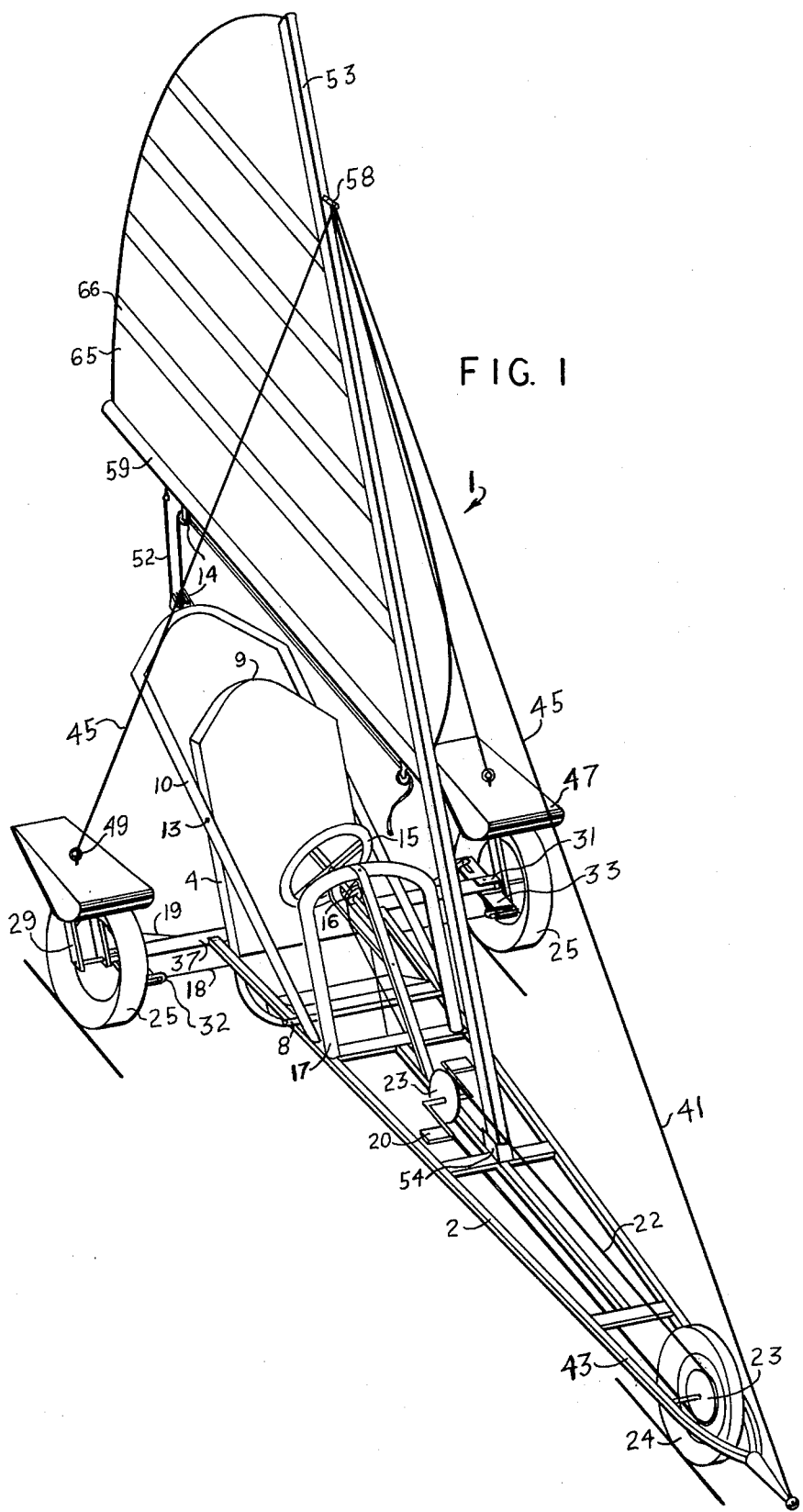
FIG. 1 is a perspective view of a self-propelled landsailer in accordance with the teachings of this invention.

Referring to FIGS. 1,2, and 4, there is shown a self-propelled landsailer of the present invention. There is shown a motorless land vehicle 1 comprised of a generally triangularly configured frame 2. The frame may be constructed of square (FIG. 1) or round (FIGS. 2,4) tubing or other elongated members and serves to support sail rig 65 of a conventional nature and common to sailboats and catamarans. A rear axle support 37 may be welded to the aft portion of the frame or advantageously detachably joined as by U-shaped brackets and clevis pin 3 as best seen in FIG. 6. Rear axle support 37 serves to support the rear surface engaging means of wheels 25 FIGS. 1-4, 7-9, and rear steering means. Frame 2 includes generally horizontal perimeter chassis tubes projecting forwardly of rear axle support 37 and includes a forward fork or bowsprit section 43. Frame 2, is further defined as including a longitudinal axis best represented by a line centrally configured within said perimeter tubes and extending from the forward portion 43 to the midpoint of rear axle support 37 and generally perpendicular to a longitudinal axis of rear axle support 37. Rear axle support remains generally fixedly transversely secured to frame 2 relative to the longitudinal axis of frame 2. As best seen in FIG. 3, rear axle support 37 is provided with a means for longitudinal adjustment 38 as by telescoping sections and registration of apertures and insertion of balldetent pins known in the art. This combination facilitates a change of lateral wheelbase as may be needed to increase stability of the vehicle in high winds or to permit autos to pass the vehicle easily on uphill climbs. Additionally, rear axle support may be braced against heavy loads by load resisting cable 39 and struts 40; such deflexor cables may be easily adjusted in length by conventional means such as turnbuckles (not shown.)

A fork means or front fork bowsprit and wheel protector 43, FIGS. 1,2, is mounted at the forward end of frame 2 and serves to support the front wheel(s) 24. Multiple front wheels may be desired to increase floatation in sand, mud, etc. Bowsprit 43 provides a means to secure forward mast support cable 41 and a means whereby the frame may be adjusted in length or longitudinally to increase stability or sail area 61 by means of telescoping in section 44 FIG. 2, of frame 2 and being secured by a pin and registration of apertures. Upper and lower noseplate 2a FIG. 4 may be provided with vertical axis pins to secure and permit outer portions of frame 2 to fold inwardly generally alongside central frame member for storage or transport. Noseplate and axis pins in combination, as indicated by 2a, FIG. 4, provide means to fold outer frame portions together during disassembly for storage.

Referring to FIG. 6, a seat 4 is provided for the occupant(s) or pilot's comfort and secured to frame 2 as by eyebolt 6 and U-shaped clamp circumventing outer frame member 5. Clamp 5 is slidable on frame 2 to permit adjustment fore and aft. Forward member of seat 8 FIG. 1 is rotatably secured in eye 6 FIG. 6 and permits the seat(s) to be suspended by resilient member or spring 7 for further comfort. The upper portion 9 of seat 4 also serves as a rollbar (being substantially higher than the pilot's head) in the event of a capsize. Additionally a brace 10 being pivotally and slidably connected to frame 2 by U-shaped brackets 11 and axis pin 12, and pivotally connected to seat 4 by axis pin 13 reinforces the seat and provides a means to secure sail trim blocks 14 at the upper limits of brace 10.

A rear wheel steering means is provided as best seen in FIGS. 7,8,9 to permit the pilot to navigate as may be desired. A pair of laterally spaced rear wheels and their wheel-carrying stub axles 25 are rotatably and pivotally mounted at the outer ends of axle support 37 as by means of vertical fork 29, and U-shaped bracket 31, and axis pin 30. Rear wheel brace 26 is secured to rear axle support as by clamp 27 and pivotally to verticle fork 29 as by U-bracket 28 and axis pin 30. A steering lever 33 is fixedly secured to the underside of U-bracket 31 FIG. 7 to serve as cable attachment means for steering cables 18, and 19 and to transfer a steering force from the pilot to the wheels 25 through axis pins 30. Thus the wheel 25 is displaced angularly with respect to the longitudinal axis of the rear axle support 37. Slot 34 and extender tang 36 serve advantageously to permit each rear wheel to independently assume a relatively correct angularity, radius, or alignment, with respect to the front wheel in a given turn. More specifically, when a steering force from steering unit 15, FIG. 5, exerted through flexible element or cable 18, 19, FIG. 7, and steering lever 33, and independent, different, but generally corresponding displacement of each rear wheel results. In practice this non-parallel arrangement of each rear wheel in a turn produces a smooth, well-aligned, non-abrasive action of the tires on the road surface.

To provide means for each rear wheel to assume its proper radius in a turn, slot 34, FIG. 7, is advantageously situated a given distance from axis pin 30 depending upon overall rear axle width of rear axle support 37. In operation steering cable or flexible element 19, FIG. 7, will slide across slot 34 to allow the wheel 25 on the inside of the turn to assume a sharper radius or transcribe a smaller circle than the opposite wheel which is accordingly allowed to assume a larger radius turn than the inside wheel. The result is a smooth, well-aligned turning action, regardless of wheelbase.

Clevis and pin combination 32, FIG. 9, provide means for readily detaching steering linkage for disassembly. A clevis 32 and pin may permit easy detachment of control cables 18,19 from lever 33 for disassembly.

Rear wheel alignment/adjustment is possible by cable turnbuckles or the like, known in the art, and inserted on cables 18 and 19 and integral between the wheels.

In the preferred embodiment the pilot may exert a steering force on steering unit 15 rotatably secured in arcuate frame member 17 FIG. 5 and bearing support 21 FIG. 2 thus moving forward steering linkage cable 18 FIG. 7 through drive pulley 16 FIG. 2. Guide pulleys or sheaves 50 and guide sleeve 19a FIG. 7 serve as guides and bearing surfaces to transfer the force to forward portion of steering lever 33 and wheels 25. A ft steering control cable 19 is thus moved and will produce a corresponding motion in the opposite wheel and may slide in slot 34 as may be needed to maintain tension in the steering linkage and proper alignment of the wheels 25 fore and aft steering control cables 18 and 19 respectively, and pulley and sheaves 16 and 50 respectively, serve in combination as a steering linkage system and provide means for rear wheel steering from rider operable seat position through movement of steering unit 15.

Wheel protectors or guards 35 FIGS. 2, 7-9 may be provided for safety during racing and to facilitate mounting means for conventional bicycle caliper brakes 51 FIG. 2 or to secure lights, signals, generators, etc. as may be required for road use.

A sailing rig 65 FIGS. 1,2,4 of conventional nature is secured to frame 2 as by means of mast step box 54 and axis pin 55 FIG. 2. Box 54 is preferably open in the aft end to permit mast 53 to pivot fore and aft. This movement (rake angle) about axis pin 55 facilitates folding of the mast rearward generally parallel with frame 2 upon removal of support cables 41,45, seat 4, seat brace 10, and steering unit arcuate support 17 pivotally secured by easily releasable clevis pins in U-shaped brackets 5,11, and 3, FIG. 2. Mast step box 54 may be secured to frame 2 by a central axis pin to permit mast 53 to rotate with respect to the frame as may be needed with some wing masts known in the art. Mast 53 is supported in a generally upright position by supporting cables 41,45 secured to shackle 58 and indirectly to frame 2. Cables 41 and 45 are detachable and adjustable in length by conventional means such as turnbuckles and clevises. Such adjustment controls the rake angle of the mast and may raise or lower the center of pressure of the sail rig 65 FIG. 2. Also mast 53 is provided with a means for longitudinal adjustment to meet varying road and wind conditions as by means of telescoping sleeve 53a, apertures 57, and pin 57a. With the lower portion of mast 53 resting on pin 57a another means of rotaton of mast 53 is provided.

A boom 59 FIGS. 1,2 is pivotally secured to mast 53 as by U-shaped bracket 60 or other conventional sailing methods. Main sheet or line 52 operating from blocks 14 and secured to seat brace 10 FIG. 2 provides one means to control sail trim and is conventional in the art.

Foresail 61 and mainsail 65, FIG. 2, may employ batons inserted in batons pockets 66 to stiffen and form the sail into a desirable airfoil shape. An emergency braking and wind release ribbon 62 is provided as may be needed in high speed road travel. By pulling on ribbon and cable combination 62 operating advantageously from boom 59, sail grommets 63, mast shackle 58, sheave 56 on axis pin 55, accessable from cleat 64, sail 65 is compelled to fold up, accordion style, spilling the wind, destroying the airfoil shape and thrust reducing sail area, and forming a semiparachute effect in the upper portion of sail 65, thus slowing the craft.

Additionally there is provided an impact reduction unit 42 of resilient means such as spring 42 which permits mast 53 to pivot rearwardly upon impact with overhead wires or bridges and minimize damage to the vehicle. Strong force on mainsheet 52 might also increase the rake angle of mast 53 and temporarily lower the height of the sail craft vehicle to clear obstructions.

An occupant or rider-operable drive means FIGS. 1,2,4 is provided to assist the locomotion of the vehicle should the wind fail. FIG. 4 reveals a means for two riders to pedal the craft by means of pedal crank 20 journaled in bearing supports 21, fixedly secured to frame 2. Transmission means FIGS. 1,2,4 may be a chain or belt 22, mechanically coupled to drive sprockets/pulleys 23 on pedal crank 20 and forward wheel(s) 24 to facilitate front wheel drive propulsion in accordance with the present invention.

A conventional bike gear shift (not shown) or multiple sprocket arrangement and a derailleur system with its associated controls mounted on frame 2 for the pilot may be employed advantageously. Alternatively, planetary 3-speed gear hubs or front wheel coaster gearing with built in back-cranking operable from pedal crank 20 may be more economical.

A landsailer of the present invention might also utilize vehicle stabilizers 47 FIGS. 1-4,8,9 of a generally negative lift aerodynamic cross-section to resist lifting of the wheels in high velocity cross winds and capsizing the craft. Stabilizers 47 are rotatably and pivotally secured in upper portion of frame verticle forks 29 as by pivot axis eyebolts 49. Said eyebolts may be loosely journaled through bushing 48 FIGS. 8,9 to permit limited pivotal tilting of stabilizer 47. Tail fins 47a prompt stabilizer to turn and face into the prevailing winds in the manner of a weather vane.

For example, in automatic operation, as a forceful prevailing wind strikes the starboard side of sail 65 FIG. 2, stabilizer 47 rotates to face into the wind and by aerodynamic law (Bernoulli's Principle) a downward force is exerted on wheel 25. Further wind pressure pushes mast 53 to portside, thus tensioning flexible element 45 fixedly secured to resilient member or spring 46 which becomes extended. The remaining length of flexible element or cable 45, being fixedly secured to the aft portion of stabilizer 47, is thus pulled upward causing stabilizer 47 to assume a negative angle of attack relative to the prevailing wind and exerting an even greater downward force on the wheel. Purpose of spring 46 is permit stabilizer 47 to remain substantialy neutral in light winds and reduce drag.

Additionally, vehicle stabilizer 47, FIG. 2 may be constructed of sufficiently strong and rigid material such as fiberglass and foam, to act as a remote seating means with the rider generally straddling support cable 45 and sitting above wheel 25 to insure surface contact and resist capsizing. A remote steering means is provided as in FIG. 2 comprised of a handle portion and elongated arm pivotaly secured to steering unit 15 by means of U-shaped bracket and axis pin 15b. Thus remotely seated pilot may, by employing a generally reciprocating action, steer the craft in severe winds with stability, safety, and control. Alternatively, the operator may prefer to "reef in" the sails to reduce sail area in high winds.

In actual practice, the pilot(s) of the self-propelled landsailer climb into seat 4, FIGS. 1,2 of the assembled vehicle and may then, dependent on wind conditions, either pull-in or release sail trim sheets 52 to "catch the wind," or commence pedaling of crank 20 to start forward motion. The vehicle, as explained, is steered by steering unit 15. Upon reaching the desired destination the pilot(s) may release the main sheets 52, apply the brake, or turn into the wind to stop the craft.

Thus there is provided an energy efficient, self-propelled landsailer well adapted to roadway travel and commuting long distances with minimum effort and great pleasure.

Although exemplary embodiments of the invention have been shown and described, many changes, modifications, and substitutions may be made by one having ordinary skill in the art without necessarily departing from the spirit and scope of this invention. It is intended that all matter contained in the above description or shown in the accompanying drawings shall be interpreted as illustrative and not in a limiting sense.

Having described the invention, what is claimed as new and desired to secure by Letters Patent is:

1. A motorless land vehicle comprising, in combination, a generally triangularly configured frame,
   said frame formed of a plurality of elongated members,
   said frame including a fork means substantially rigidly secured at the forward end of said frame to carry a rotatable forward wheel,
   said frame including a longitudinal axis centrally configured within said frame from fore and aft,
   a rear axle support substantially rigidly secured to said frame and transversely oriented with respect to the longitudinal axis of said frame,
   a pair of wheel forks pivotally secured about a generally vertical axis to the outer opposite ends of said rear axle support,
   said wheel forks including the attachment of wheel-carrying stub axles,
   a rear steering means including, in combination, a steering unit, a steering linkage, said wheel forks, said wheel-carrying stub axles, a steering lever, a clevis and pin, and a steering lever slot wherein movement of said steering unit causes said clevis and pin to slide in said steering lever slot for the purpose of causing each of said wheel-carrying stub axles to turn generally different accounts at the same time with respect to the longitudinal axis of said frame,
   a seat secured to said frame suitable for a rider, said seat including means for adjustment, said seat including a roll-bar portion, said frame including rider operable drive means.

2. A vehicle as defined in claim 1 wherein said frame includes the attachment of a sailing rig as an alternate propulsion means of said vehicle,
   said sailing rig including, in combination, a mast, boom, sail, grommet, shackle, sheave, cable, and wind release ribbon,
   said frame including means for the rotational attachment of said mast to said frame about a generally vertical axis,
   said mast including means for longitudinal adjustment,
   means for the adjustment of the rake angle of said mast with respect to the longitudinal axis of said frame,
   means for trim control of said sailing rig,
   said sailing rig including an impact reduction unit.

3. A vehicle as defined in claim 2 wherein said rear axle support includes means for longitudinal adjustment for the purpose of changing the lateral wheelbase of said vehicle,
   said frame including means for longitudinal adjustment.

4. A vehcile as defined in claim 3 wherein said forks have rotatably and pivotally secured thereupon vehicle stabilizers,
   said stabilizers being of a generally aerodynamic cross-section,
   said stabilizers including means to rotate about a generally vertically disposed axis in response to the prevailing winds for the purpose of exerting a downward force on said forks,
   said stabilizers being sufficiently rigid to support a rider as a remote seating position,
   said rear steering means including a remote steering control means operable from said remote seating position.

* * * * *